United States Patent [19]

Kalisz

[11] Patent Number: 5,116,701
[45] Date of Patent: May 26, 1992

[54] MICROPOROUS SEPARATOR COMPOSED OF MICROSPHERES SECURED TO AN ELECTRODE STRIP

[75] Inventor: David W. Kalisz, Lakewood, Ohio

[73] Assignee: Eveready Battery Company, Inc., St. Louis, Mo.

[21] Appl. No.: 660,184

[22] Filed: Feb. 22, 1991

[51] Int. Cl.$^5$ .............................. H01M 2/18
[52] U.S. Cl. ................... 429/130; 429/146; 429/246
[58] Field of Search ............ 429/130, 142, 143, 146, 429/246; 428/325

[56] References Cited

U.S. PATENT DOCUMENTS

| | | | |
|---|---|---|---|
| 3,208,881 | 9/1965 | Fallon | 429/130 |
| 3,279,951 | 10/1966 | Bowers et al. | 429/130 X |
| 3,317,350 | 5/1967 | Murphy | 429/130 X |
| 3,343,992 | 9/1967 | Bowers et al. | 429/130 X |
| 3,451,855 | 6/1969 | Jones et al. | 429/130 X |
| 4,158,085 | 6/1979 | Bilhorn | 429/130 |
| 4,315,976 | 2/1982 | Conte | 429/194 |

FOREIGN PATENT DOCUMENTS 50-064735 6/1975 Japan .
57-172660 10/1982 Japan .

*Primary Examiner*—Anthony Skapars
*Attorney, Agent, or Firm*—Robert W. Welsh

[57] ABSTRACT

An electrode and separator composite composed of an electrode strip, such as a lithium strip, having a microporous separator secured to its surface in which the separator comprises a layer of insulating microspheres, such as glass microspheres measuring from 5 microns to 0.05 inch in diameter, partially embedded in the surface of the electrode strip.

20 Claims, No Drawings

MICROPOROUS SEPARATOR COMPOSED OF MICROSPHERES SECURED TO AN ELECTRODE STRIP

FIELD OF THE INVENTION

The invention relates to an electrode having secured to its surface a separator composed of a layer of glass or ceramic microspheres partially embedded into the surface of the electrode strip thereby producing a microporous separator integral with the electrode.

BACKGROUND OF THE INVENTION

The development of high energy cell systems requires the compatibility of an electrolyte possessing desirable electrochemical properties with highly active anode materials, such as lithium, calcium, sodium and the like, and the efficient use of high energy density cathode materials, such as $FeS_2$, $Co_3O_4$, $PbO_2$, $TiS_2$, $Li_xCoO_2$, $MnO_2$, $(CF_x)_n$, oxyhalides and the like. One drawback in the manufacturing and assembling of these high energy cell systems is that the anodes, such as lithium, are usually soft, sticky material having a tendency to stick together when they are transported between areas for assembly into cells. In addition, anodes such as lithium have a tendency to accumulate static charge buildup during their transportation from the manufacturing facilities to the assembling facilities.

To achieve optimum battery performance with respect to power output, the surface of electrodes, such as a lithium electrode, should be made as large as is practicable. To achieve an electrode having an optimum surface area, it is generally necessary to roll the lithium metal to a predetermined length and thickness. When attempts have been made to roll and shape sheet or foil of lithium, the lithium may adhere to the rollers and as a result, efforts at rolling thin lithium sheets or foils have generally been extremely difficult.

In the manufacture of soft, sticky strips of lithium, it has been proposed in the prior art, specifically U.S. Pat. No. 3,721,113, that thin continuous lithium strips can be produced by cold rolling lithium metal while it is compressed between smooth surfaces of a solid polymeric composition, which composition is nonreactive with lithium and has a critical surface tension of not over 46 dynes per centimeter at 20° C. The use of the polymeric sheet material is essential so as to prevent the sticking of the lithium to the metal surfaces of the roller. Once continuous lithium strips are produced, another problem encountered is in the cutting of the lithium metal into a plurality of pieces which can be employed as lithium anodes in various types of cell systems. To overcome this problem it is disclosed in the prior art, specifically U.S. Pat. No. 4,060,017, that a flexible film, preferably of plastic, be interposed between the blade of a cutting device and a lithium strip such that when the blade is forced against the anvil with sufficient force to cut the lithium, the film prevents contact of the blade with the lithium. This will prevent any buildup of lithium being developed on the blade which would occur generally after only a few cutting operations. Although solutions in the prior art have been proposed for the manufacture of a plurality of lithium electrodes from lithium strip material, one problem that still exists is in the transporting of the lithium electrodes from the manufacturing site to the assembly site where they will be assembled into a cell. Rectangular, square, circular or other shaped lithium electrodes are usually transported to the assembly station where they are then fed into automatic feeding machines and assembled into a cell container. It has been observed that during the transporting to and automatic feeding of the lithium anodes at the assembly station, there is a tendency for freshly cut lithium anodes to stick to themselves and to accumulate static charge whereupon the anodes then tend to stick to other surfaces resulting in a disruption of the assembly operation. This problem is most pronounced in employing lithium anodes for miniature type button cells in which the anodes can be as small as a square measuring 0.22 inch by 0.10 inch thick. An additional problem encountered during the transporting to and the feeding of lithium anodes at the assembly site is that there is a tendency for a coating of the lithium to build up on any metallic or plastic surface that they contact. In the manufacture of lithium strips, this tendency of the lithium buildup on metal surfaces can be eliminated through the use of polymeric materials as described above in conjunction with U.S. Pat. No. 3,721,113 and in the use of a flexible plastic film as discussed above in conjunction with U.S. Pat. No. 4,060,017. These solutions cannot be efficiently employed in the transportation of small size lithium anodes to the assembly site since such anodes are relatively small discrete bodies and any attempts to apply a plastic or polymeric material between the anodes would be time consuming, laborious and expensive.

U.S. Pat. No. 4,315,976 discloses a soft active anode coated on its surface with an electrically nonconductive and chemically and electrochemically inert particulate material, such as talc, in an amount between about 0.1 milligram per square centimeter and about 8 milligrams per square centimeter, preferably between about 0.3 milligram per square centimeter and about 4 milligrams per square centimeter, so as to retard static buildup and the tendency of the anode to stick to surfaces and other anodes prior to its assembly into a cell.

In addition to means for facilitating the handling of soft electrodes, a separator is generally disposed against the electrode in an assembled cell. Conventional type nonwoven glass fiber separators employing organic binders such as polyvinyl alcohol (PVA) have created problems in nonaqueous cells, such as lithium thionyl chloride cells. Specifically, the PVA binder has been found to cause gassing in the cell which results in premature venting on high temperature storage. To alleviate this problem, separators with a very low binder content or ones containing no binder could be used. Japanese application 1975/64735 discloses the use of glass beads on one side of an AgCl cathode as a separator in an Mg/AgCl seawater battery. Japanese Patent Application 1982/172660 discloses the use of glass beads embedded within a lithium anode to serve as a separator for a lithium cell. The glass beads are used to provide a space between the lithium anode and a positive electrode that will permit circulation of the cell's electrolyte solution between the electrodes of the cell.

U.S. Pat. No. 4,158,085 discloses an electrode with separator beads embedded therein, such beads having a coating of adhesive to improve their adherence to the electrode surface.

One of the objects of the present invention is to provide an electrode-separator composite for an electrochemical cell which comprises a microporous separator composed of a layer of insulating microspheres partially embedded in the surface of the electrode, thereby producing an integral electrode and separator composite that is easy to handle prior to and during assembly operations and a composite that will occupy a relatively small space in an electrochemical cell.

Another object of the present invention is to provide a binder-free separator composed of microspheres that are partially embedded in the surface of an electrode to produce a microporous separator having a micronodular surface contour and secured in the surface of a soft electrode.

Another object of the present invention is to partially embed a layer of glass or ceramic microspheres into the surface of a soft electrode and wherein said microspheres have a diameter between about 5 microns and about 0.05 inch.

SUMMARY OF THE INVENTION

The invention relates to an integral electrode and separator composite comprising an electrode strip having a microporous separator secured to its surface, said microporous separator comprising at least one layer of insulating microspheres partially embedded in the surface of the electrode strip wherein said microspheres are from 5 microns to 0.05 inch in diameter and covering at least 65 percent of the defined area of the surface of the electrode strip where the microspheres are embedded in the electrode.

As used herein, a microporous separator is a separator composed of a layer of microspheres in which the microspheres substantially contact each other so that the space between the microspheres provides microporous paths for the electrolyte solution to contact the electrode.

As used herein, a micronodular surface is a surface that may appear smooth to the human eye but under a microscope will appear as a nodular surface resembling the outer surface of an orange.

As used herein, microspheres are extremely small solid particles or hollow particles having a substantially spherical shape.

In a preferred embodiment of the invention a soft electrode, such as a lithium strip, would be contacted with a plurality of microspheres of an insulating material, such as glass or ceramic, and wherein the first layer of said microspheres would be partially embedded in the soft electrode. An additional layer or layers of the microspheres could be deposited on and secured to the first layer thereby producing a separator of one or more layers of microspheres having a micronodular outer surface contour. The microspheres would be substantially in contact with adjacent microspheres. This separator composed of microspheres will serve as the separator of the composite and will be microporous with a micronodular outer surface contour. This separator composed of microspheres may be used as the sole separator or in some applications this separator may be used in conjunction with a thin layer of a fiber separator material, preferably a binder-free fiber separator material. The microspheres will provide a strong insulating layer while the fiber separator could provide a web needed for preventing particle migrations within a cell, such as carbon particles migrating from a carbon collector surface, and the fiber separator could also function to maintain separation of the electrodes during discharge if some of the microspheres become dislodged.

To insure that the microspheres remain secured to the electrode surface, the first layer of microspheres should preferably be embedded into the surface of the electrode a distance equal to about 30 percent of their diameter, preferably about 50 percent or more of their diameter. However, the overall thickness of the electrode would increase by the number of layers of microspheres on the electrode surface. Thus the first layer could be embedded into the electrode surface and an additional layer of microspheres could be disposed on and secured to said first layer.

The microspheres for use in this invention can preferably be glass or ceramic microspheres having a diameter of from 5 microns to 0.05 inch, preferably from 10 to 300 microns. The microspheres could be solid or hollow. If hollow, the microspheres could have a wall thickness of about 0.5 to 50 microns, preferably about 0.5 to 30 microns. An example of glass microspheres are glass bubbles made of soda-lime-borosilicate glass having a diameter of 10 to 300 microns and a wall thickness of 0.5 to 30 microns. These microspheres look like a fine powder and have a high degree of fluidity. They can be applied to an electrode simply by manually sifting the microspheres onto the sides of the electrode and pressing the powder-like microspheres slightly into the electrode surface, e.g., by rolling the coated electrode to produce an evenly distributed layer or layers.

In addition to providing a binder-free separator for the electrode, the insulating microspheres are generally so small that the thickness of the separator is substantially reduced over conventional separators so that more active material can be assembled in a fixed size cell, thereby producing an increased capacity input. Safety features may also be achieved with the use of ceramic microspheres which would have a much higher softening point than glass, and hence higher cell temperatures could be tolerated before interelectrode shorting could occur. The electrode-separator composite of this invention would also have the advantage in cell assembly in that higher winding speeds for jellyroll type cells could be used with little worry about tearing of fragile separator fabric.

Preferably, the defined area of the electrode containing the embedded microspheres should be covered by at least 65 percent, more preferably at least about 90 percent by the microspheres. Less than about 65 percent coverage of the area of the electrode would generally provide insufficient interelectrode insulation.

A benefit in using hollow microspheres is that a controlled substance could be encased within the microspheres that could be released during cell abuse to provide localized reaction inhibition. For example, a substance could be encased that would passivate a lithium anode so that when released under cell abuse conditions, the lithium anode could be passivated so that any external short could be opened.

Soft active electrode members suitable for use in this invention can be selected from the group consisting of lithium, sodium, calcium and the like. It has been observed, specifically in the manufacture and assembling of lithium anodes into cells, that lithium has a tendency to stick to metal and plastic surfaces. By coating the surface of the electrode with the layer of insulating microspheres, the microspheres will act as a blocking layer to prevent the lithium from sticking to other metal and plastic surfaces as well as to other lithium anodes.

Suitable solid active cathode materials are electrochemically reducible materials. Such materials include natural or synthetic iron sulfides such as $FeS_2$ and $FeS$, manganese oxides such as $MnO_2$, carbon fluorides such as $(CF_x)_n$ or $(C_2F)_n$, $V_2O_5$, $WO_3$, $MoO_3$, $MoS_2$, lead oxides, cobalt oxides, lithium cobalt oxide, lithium nickel cobalt oxide, copper oxides, copper sulfides, $In_2S_3$, NiS, $Ag_2CrO_4$, $Ag_3PO_4$, transition metal sulfides such as $TiS_2$, transition metal polysulfides, and mixtures thereof. By "active cathode" is meant the material being reduced in the electrochemical reaction. The active cathode material is formed into the positive electrode by mixing the active cathode material with an amount of a suitable conductive material such as carbon, if needed, and an amount of a suitable binder. The mixture can then be formed into a strip material or pressed, impregnated or coated onto a suitable carrier such as foil or expanded metal. After being formed into the strip, the electrode will typically have a cathode collector portion contacting the strip.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 63rd Edition, The CRC Press Inc., Boca Raton, Fla., 1982–1983. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material would be liquid sulfur dioxide.

Suitable electrolytes for use in the cells of this invention can be aqueous or nonaqueous. Nonaqueous electrolytes can employ organic or inorganic solvents containing a conductive solute. Suitable organic solvents include tetrahydrofuran (THF), dioxolane, dimethoxyethane (DME), dimethyl isoxazole (DMI), 3-methyl-2-oxazolidone, diethyl carbonate (DEC), propylene carbonate, ethylene carbonate, ethylene glycol sulfite (EGS), dioxane, dimethyl sulfite (DMS), or the like and mixtures thereof.

Suitable salts include: $MAlX_4$, $MCF_3SO_3$, MSCN, $MBF_4$, $MClO_4$, and $MM'F_6$ wherein M is lithium, sodium or potassium, M' is phosphorus, arsenic or antimony and X is chlorine or bromine. The particular salt selected is compatible and nonreactive with the solvent and the electrodes of the cell. The amount of salt to be added to the solvent should be sufficient to provide an ionically conductive solution with a conductivity of at least about $10^{-4} ohm^{-1} cm^{-1}$. Typically, about 0.5 M of the salt will be sufficient. An example of a preferred organic electrolyte is a mixture of dioxolane, 3-methyl-2-oxazalidone, and dlmethoxyethane, and $LiCF_3SO_3$.

The integral electrode and separator composite of this invention is ideally suited for use in lithium-$SOCl_2$ cell systems since the separator component of the cell would not contain any binder. As stated above, a binder such as polyvinyl alcohol could cause gassing in the cell which results in premature venting on high temperature storage. The separator layer can preferably be as thin as about 100 microns on each side of the electrode and thereby provide more space in the cell for the active components of the electrochemical system. For example, glass microspheres which were obtained from 3M Company and comprised soda-lime-borosilicate glass microspheres having a diameter of from 10 to 140 microns and a wall thickness of 0.5 to 2 microns. These microspheres had a high degree of fluidity and were manually sifted onto both sides of several samples of a lithium anode strip. The microspheres were pressed slightly into the electrode surface. The thickness of the lithium anode samples was measured before and after the deposit of the microspheres and the results are shown in the Table below:

TABLE

| Sample | Lithium Sample Thickness (inches) | |
|---|---|---|
| | Uncoated | Coated |
| A | 0.0142 | 0.0148 |
| B | 0.0142 | 0.0148 |
| C | 0.0143 | 0.0149 |
| D | 0.0144 | 0.0150 |
| E | 0.0142 | 0.0146 |
| F | 0.0142 | 0.0152 |
| G | 0.0142 | 0.0152 |
| H | 0.0143 | 0.0154 |

The glass microspheres were found to increase the thickness of the electrode by an average of less than 0.0004 inch (400 microns) on each side. Resistance measurements were made of the glass microsphere-coated lithium electrodes using conventional volt/ohmmeter and the electrodes were found to have zero conductivity on the electrode surfaces due to the presence of the insulating glass microspheres.

It is to be understood that modifications and changes to the preferred embodiment of the invention herein described can be made without departing from the spirit and scope of the invention. For example, urea-formaldehyde resin microspheres could be used to enclose a liquid or solid substance that could be released during cell abuse to provide such substance to inhibit or otherwise prevent undesirable reactions from occurring. In lithium cell systems, a passivating agent such as iron compounds ($FeCl_3$) or zinc compounds ($ZnCl_2$) could be encapsulated within the microspheres made of a material which is stable under normal cell operating conditions but which would be released by heat and/or pressure when the cell is subjected to abuse conditions. In this embodiment, the surface of the lithium anode could be passivated, preferably completely passivated, so that an external short on the cell would be opened.

What is claimed:

1. An integral electrode and separator composite comprising an electrode strip having a microporous separator secured to its surface, said microporous separator comprising at least one layer of insulating microspheres contacting each other and partially embedded in the surface of the electrode strip and wherein said microspheres are from 5 microns to 0.05 inch in diameter and cover at least 65 percent of the area of the surface of the electrode strip defined by the microsphere layer.

2. The integral electrode and separator composite of claim 1 wherein the insulating microspheres are selected from the group consisting of glass and ceramic.

3. The integral electrode and separator composite of claim 1 wherein the diameter of the microspheres is from 5 microns to 0.05 inch.

4. The integral electrode and separator composite of claim 3 wherein the insulating microspheres are selected from the group consisting of glass and ceramic.

5. The integral electrode and separator composite of claim 1 wherein the insulating microspheres are hollow.

6. The integral electrode and separator composite of claim 5 wherein the insulating microspheres are selected from the group consisting of glass and ceramic.

7. The integral electrode and separator composite of claim 6 wherein the diameter of the insulating microspheres is from 5 microns to 0.05 inch and the wall thickness is from 0.5 to 50 microns.

8. The integral electrode and separator composite of claim 7 wherein the electrode strip is an anode material and an anode passivating agent is contained within the hollow microspheres.

9. The integral electrode and separator composite of claim 8 wherein the electrode is lithium and the passivating agent is an iron compound.

10. The integral electrode and separator composite of claim 8 wherein the electrode is lithium and the passivating agent is a zinc compound.

11. The integral electrode and separator composite of claim 1 wherein the electrode is an anode and the anode is selected from the group consisting of lithium, sodium and calcium.

12. The integral electrode and separator composite of claim 11 wherein the electrode is lithium.

13. The integral electrode and separator composite of claim 11 wherein the microspheres are selected from the group consisting of glass and ceramic.

14. The integral electrode and separator composite of claim 13 wherein the diameter of the insulating microspheres is from 5 microns to 0.05 inch.

15. The integral electrode and separator composite of claim 14 wherein the microspheres are hollow.

16. The integral electrode and separator composite of claim 15 wherein the diameter of the insulating microspheres is from 5 microns to 0.05 inch and the wall thickness is from 0.5 to 50 microns.

17. The integral electrode and separator composite of claim 15 wherein the anode is lithium.

18. The integral electrode and separator composite of claim 17 wherein the insulating microspheres are glass microspheres.

19. The integral electrode and separator composite of claim 18 wherein the diameter of the insulating microspheres is from 10 to 300 microns and the wall thickness is from 0.5 to 30 microns.

20. The integral electrode and separator composite of claim 19 wherein the insulating glass microspheres are made of soda-lime-borosilicate glass.

* * * * *